United States Patent
Yang et al.

(10) Patent No.: US 10,971,804 B2
(45) Date of Patent: *Apr. 6, 2021

(54) WIRELESS WEARABLE DEVICES HAVING SELF-STEERING ANTENNAS

(71) Applicant: Intel Corporation, Santa Clara, CA (US)

(72) Inventors: Songnan Yang, San Jose, CA (US); Jie Gao, Sunnyvale, CA (US); Dounia Baiya, San Jose, CA (US); Manish A. Hiranandani, Santa Clara, CA (US); Ulun Karacaoglu, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/402,861

(22) Filed: May 3, 2019

(65) Prior Publication Data
US 2019/0260117 A1    Aug. 22, 2019

Related U.S. Application Data

(63) Continuation of application No. 15/469,717, filed on Mar. 27, 2017, now Pat. No. 10,283,850.

(51) Int. Cl.
*H01Q 1/27*    (2006.01)
*H04B 1/3827*    (2015.01)
(Continued)

(52) U.S. Cl.
CPC ........... *H01Q 1/273* (2013.01); *H01Q 1/1257* (2013.01); *H01Q 1/18* (2013.01); *H01Q 1/42* (2013.01);
(Continued)

(58) Field of Classification Search
CPC .... H01Q 15/0013; H01Q 1/273; H01Q 1/526; H01Q 1/243; H01Q 1/241; H01Q 1/1257;
(Continued)

(56) References Cited

U.S. PATENT DOCUMENTS 7,095,376 B1    8/2006    Timothy et al.
9,401,540 B2    7/2016    Osterhout et al.
(Continued)

OTHER PUBLICATIONS

United States Patent and Trademark Office, "Non-Final Office action," issued in connection with U.S. Appl. No. 15/469,717, dated May 17, 2018, 14 pages.
(Continued)

*Primary Examiner* — Linh V Nguyen
(74) *Attorney, Agent, or Firm* — Hanley, Flight & Zimmerman LLC (57) ABSTRACT

Wireless wearable devices having self-steering antennas are disclosed. A disclosed example wearable device includes an antenna to be communicatively coupled to a wireless data transceiver of a base station. The disclosed example wearable device also includes a steering mount coupled to the antenna, where the steering mount is to adjust an orientation of the antenna towards a wireless coverage zone associated with the wireless data transceiver based on a movement of the wearable device.

19 Claims, 10 Drawing Sheets

(51) Int. Cl.
    *H01Q 1/42*     (2006.01)
    *H01Q 1/12*     (2006.01)
    *H01Q 1/18*     (2006.01)
    *H01Q 3/08*     (2006.01)

(52) U.S. Cl.
    CPC .............. *H01Q 3/08* (2013.01); *H04B 1/385* (2013.01); *H04B 2001/3866* (2013.01)

(58) Field of Classification Search
    CPC ........... H01Q 1/3275; G06F 2221/2111; G06F 3/0383
    USPC ........................................ 343/754, 757, 718
    See application file for complete search history.

(56) References Cited

U.S. PATENT DOCUMENTS

| | | | |
|---|---|---|---|
| 9,503,628 B1 | 11/2016 | Alsalamah | |
| 10,283,850 B2* | 5/2019 | Yang | ........................ H01Q 1/42 |
| 2006/0187117 A1 | 8/2006 | Lee et al. | |
| 2006/0267764 A1* | 11/2006 | Morinaga | ............... G01S 13/04 340/545.3 |
| 2008/0231524 A1* | 9/2008 | Zeiger | .................... H01Q 1/273 343/718 |
| 2011/0090052 A1 | 4/2011 | Warner et al. | |
| 2013/0258089 A1* | 10/2013 | Lyons | ................ H04N 5/23218 348/77 |
| 2014/0240474 A1* | 8/2014 | Kondo | ................. H04N 13/341 348/56 |
| 2015/0031294 A1 | 1/2015 | Holman et al. | |
| 2015/0065893 A1 | 3/2015 | Ye | |
| 2016/0134006 A1* | 5/2016 | Ness | ........................ H01Q 3/02 343/880 |
| 2017/0179566 A1 | 6/2017 | Hirabe | |
| 2017/0285754 A1* | 10/2017 | Holman | ..................... G06F 3/012 |
| 2017/0366281 A1* | 12/2017 | Jeon | ....................... H04B 17/27 |
| 2017/0374276 A1* | 12/2017 | Veeramani | .............. G06F 3/017 |
| 2018/0020277 A1* | 1/2018 | Briggs | .................. H01Q 9/065 |
| 2018/0277937 A1 | 9/2018 | Yang et al. | |

OTHER PUBLICATIONS

United States Patent and Trademark Office, "Notice of Allowance and Fee(s) Due," issued in connection with U.S. Appl. No. 15/469,717, dated Dec. 21, 2018, 8 pages.

* cited by examiner

WIRELESS WEARABLE DEVICES HAVING SELF-STEERING ANTENNAS

RELATED APPLICATION

This patent arises as a continuation of U.S. patent application Ser. No. 15/469,717, which was filed on Mar. 27, 2017. The foregoing U.S. patent application is hereby incorporated herein by reference in its entirety.

FIELD OF THE DISCLOSURE

This disclosure relates generally to virtual reality systems and, more particularly, to wireless wearable devices having self-steering antennas.

BACKGROUND

In recent years, head-mounted virtual reality devices have been used to provide immersive experiences for users. These systems often employ a mounted headset including goggles with screen displays corresponding to each eye of a user to convey the illusion of movement or presence in a displayed environment. Depending on the resolution of the screen display used for each eye, relatively high signal communication rates, bandwidth and/or data throughput may be required to drive each of the screen displays as well as support other associated functions of the headset.

Known virtual reality headsets are often wired to a host computer so that the host computer can drive multiple displays by providing the necessary bandwidth and/or data communication rates to these displays. However, these wired systems can be cumbersome and/or limit motion of a user.

Some known wireless virtual reality headsets utilize multiple radio modules mounted to a single headset to account for a relatively narrow data transmission coverage zone (e.g., a high data rate coverage zone) of a base station to which the radio modules communicate. In particular, communication rates and/or signal integrity of a radio module can greatly decrease when the radio module is not oriented and/or within the data transmission coverage zone. Such known headsets can also have limited tracking ranges as well as coverage gaps (e.g., orientation coverage gaps), which can result in decreased communication rates and/or decreased signal integrity, thereby potentially causing loss of functionality and/or fidelity of these head-mounted displays.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Wireless wearable devices having self-steering antennas are disclosed. Known virtual reality systems typically include a wired connection to a headset so that data communication rates (e.g., transmission rates, transmit/receive rates, wireless communication rates, etc.) needed to drive multiple displays of the headset can be maintained. However, these wired systems can be cumbersome, limit motion of a user and/or hinder a virtual reality experience.

Some known wireless headsets employ multiple transceiver modules to maintain the necessary wireless communication rates to drive their respective goggle displays. However, these known wireless headsets can have limited tracking gaps (e.g., tracked only at certain orientations), orientations that result in intermittent data connections and/or orientations in which data communication rates become reduced such as when data transmission is transferred between (e.g., during a handoff) between the transceiver modules.

The examples disclosed herein enable consistent high wireless communication rates (e.g., transmission rates) as well as effective stability of these high communication rates for a head-mounted device by maintaining an orientation of a self-steering/articulating antenna of the head-mounted device within a coverage zone (e.g., a high data rate communication zone, broad-side communication sector(s), etc.) of a base station transceiver even when the head-mounted device is significantly rotated and/or translated. The example transceivers in communication with such an antenna may be implemented as a transmitter/receiver pair that is wired to a personal computer, which functions as a base station. The examples disclosed herein enable high data communication rates at almost any orientation of the head-mounted device by steering (e.g., mechanically steering) an antenna and/or a radio front end module (RFEM) of the headset towards and/or within a requisite degree of the coverage zone while the head-mounted device is being translated and/or rotated by a user when engaging in a virtual reality application/program, for example.

In some examples, a rotational gimbal is used to orient the antenna. In some examples, an antenna is oriented (e.g., further oriented) towards a preferred coverage zone (e.g., a narrower range within the coverage zone), in which communication rates are substantially increased (e.g., maximized) in comparison to other portions and/or angles of the coverage zone.

As used herein, the term "base station" refers to a device transmitting and/or receiving signals to and from the example head-mounted devices, headsets and/or wearable devices (e.g., wearables such as smart watches, body-mounted displays, etc.) disclosed herein. Accordingly, the term "base station" may refer to a computer, a gaming device, a tablet, a mobile phone and/or other portable device that is in communication with the aforementioned wearable devices. As used herein, the term "head-mounted device" refers to any wearable device that may be mounted to a head of a user, which includes, but is not limited to, virtual reality glasses, augmented reality headsets/glasses, etc.

Figure 1A:
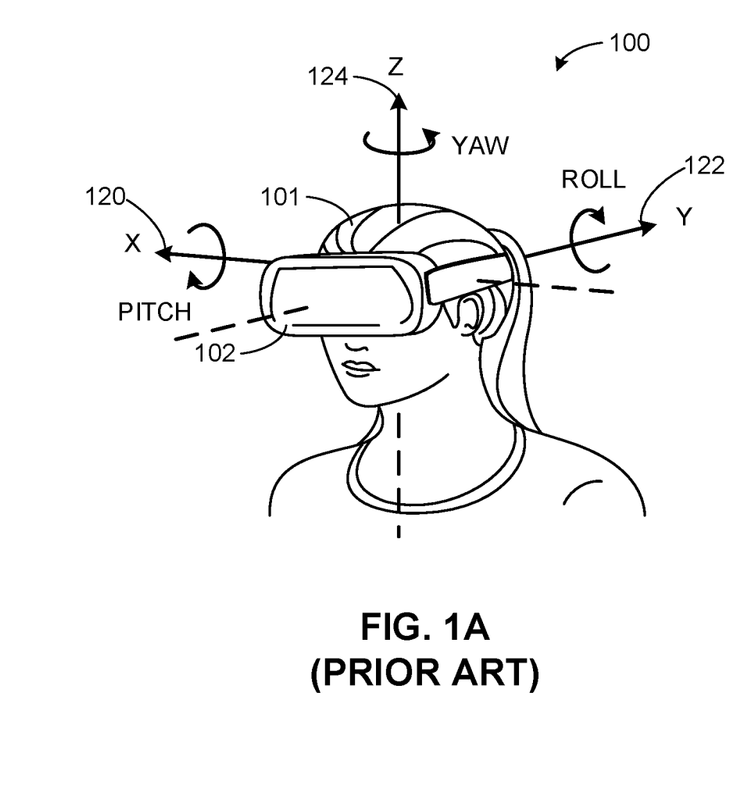
FIG. 1A illustrates a known head-mounted virtual reality headset in which the examples disclosed herein may be implemented.

FIG. 1A illustrates a known head-mounted virtual reality headset 100 in which the examples disclosed herein may be implemented. The headset 100, which is worn by a user 101, includes googles (e.g., portable screen goggles) 102 with a headband 104 to hold the headset 100 in place relative to a head of the user 101. According to the illustrated example, the headset 100 may be translated (e.g., when the user 101 moves) and/or rotated in at least three rotational axes, which are depicted as axes 120, 122 and 124 corresponding to a pitch, a roll and a yaw, respectively, of the headset 100.

In operation, the user 101 is provided with images displayed on screens of the goggles 102, thereby providing an effect of a stereoscopic image to the user 101. In this example, the goggles 102 include two displays corresponding to each eye of the user 101. According to the illustrated example, movement of the headset 100 caused by movement of the user 101 is monitored to control and/or direct images (e.g., rendered images) or video provided to the user 101 via the goggles 102.

Figure 1B:
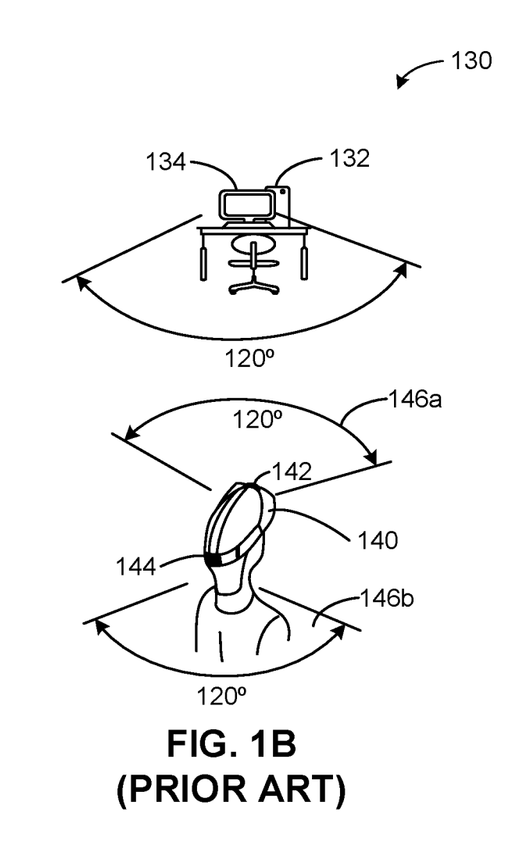
FIG. 1B illustrates a known wireless virtual reality system.

FIG. 1B illustrates a known wireless virtual reality system 130. The virtual reality system 130 includes a base station (e.g., a desktop computer) 132 with a wireless transceiver (e.g., a transmitter/receiver, a wireless virtual reality signal hub, etc.) 134. In this example, a headset 140 is wirelessly communicatively coupled to the base station 132 via the wireless transceiver 134. According to the illustrated example, the headset 140 includes a first radio front end module (RFEM) 142 and a second RFEM 144, both of which are radio communication modules/circuits and/or antenna arrays that are oriented at opposite directions from one another. In particular, the RFEM 142 is oriented towards a front of the user while the RFEM 144 is oriented towards the back of the user. The RFEM 142 and the RFEM 144 have corresponding transmission zones (e.g., areas above a threshold data transfer rate) 146a, 146b, respectively. In other words, both the RFEM 142 and the RFEM 144 have limited data transmission communication viewing angles (e.g., line-of-sight) angles that are indicated as angular ranges (e.g., cones). In this particular example, the first and second transmission zones 146a, 146b each have an approximate angular coverage band of 120 degrees.

In operation, the first RFEM 142 communicates and/or transfers and/or exchanges data (e.g., display/rendering data for goggles of the headset 140) with the transceiver 134 when the respective transmission zone 146a is oriented towards and positioned within a communication range and/or communication viewing angle (e.g., a communication view port) of the transceiver 134. In other words, this data transmission between the headset 140 and the transceiver 134 is dependent on an orientation and/or position of the headset 140. Accordingly, the second RFEM 144 transfers and/or exchanges data with the transceiver 134 when the transmission zone 146b is within the communication range and/or communication viewing angle. While the example virtual reality system 130 is able to transition communication with the transceiver 134 between the first RFEM 142 and the second RFEM 144, the virtual reality system 130 includes communication gaps when motion of the user causes a transition between the first and second transmission zones 146a, 146b.

In this example, the first RFEM 142 and the second RFEM 144 operate as a phased array, in which one of them is selected to create a data transmission link based on a respective gain at a given time. In particular, one of the first and second RFEMs 142, 144 is selected to be in wireless communication with the transceiver 134. However, when transitioning between the first RFEM 142 and the second RFEM 144 (and vice-versa) such as during a handoff therebetween, a significant drop in signal strength may occur, thereby resulting in decreased communication rates and/or data loss.

Figure 1C:
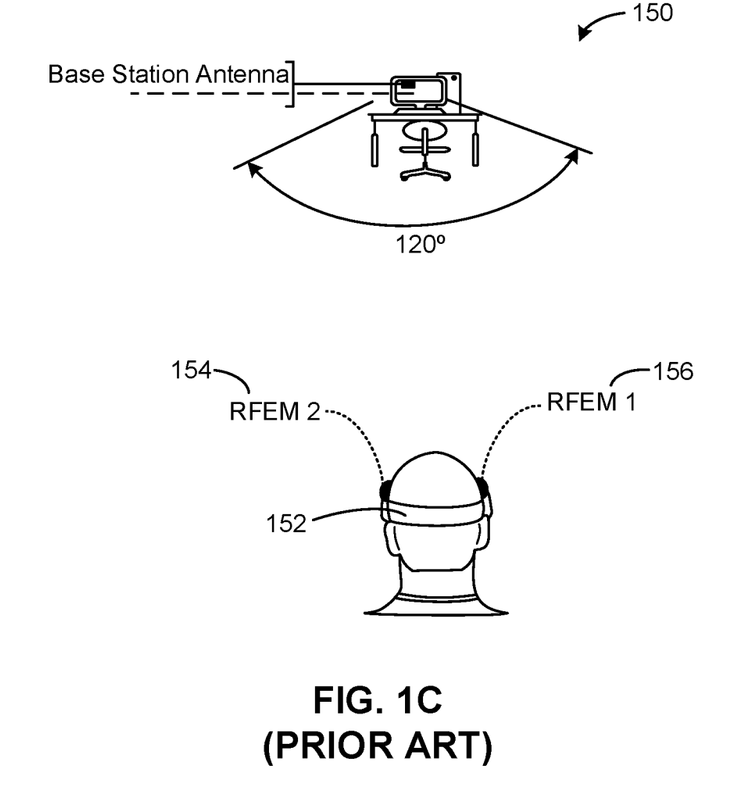
FIG. 1C illustrates another known wireless virtual reality system.

FIG. 1C illustrates another known wireless virtual reality system 150. The wireless virtual reality system 150 is similar to that shown in FIG. 1B, but includes a headset 152 with both a first RFEM 154 as well as a second RFEM 156 mounted to an anterior portion of the headset 152 instead of being positioned at opposed positions relative to a user's head, as shown with the example headset 140 of FIG. 1B. Further, in a manner similar to that described in FIG. 1B, the first RFEM 154 and the second RFEM 156 operate as a phased array. In this example, the handoff between and/or transition between the RFEM 154 and the RFEM 156 can caused a decreased communication rate. Further, certain orientations of the headset 152 can cause lapses in data transmissions from both of the RFEMS 154, 156.

Figure 2:
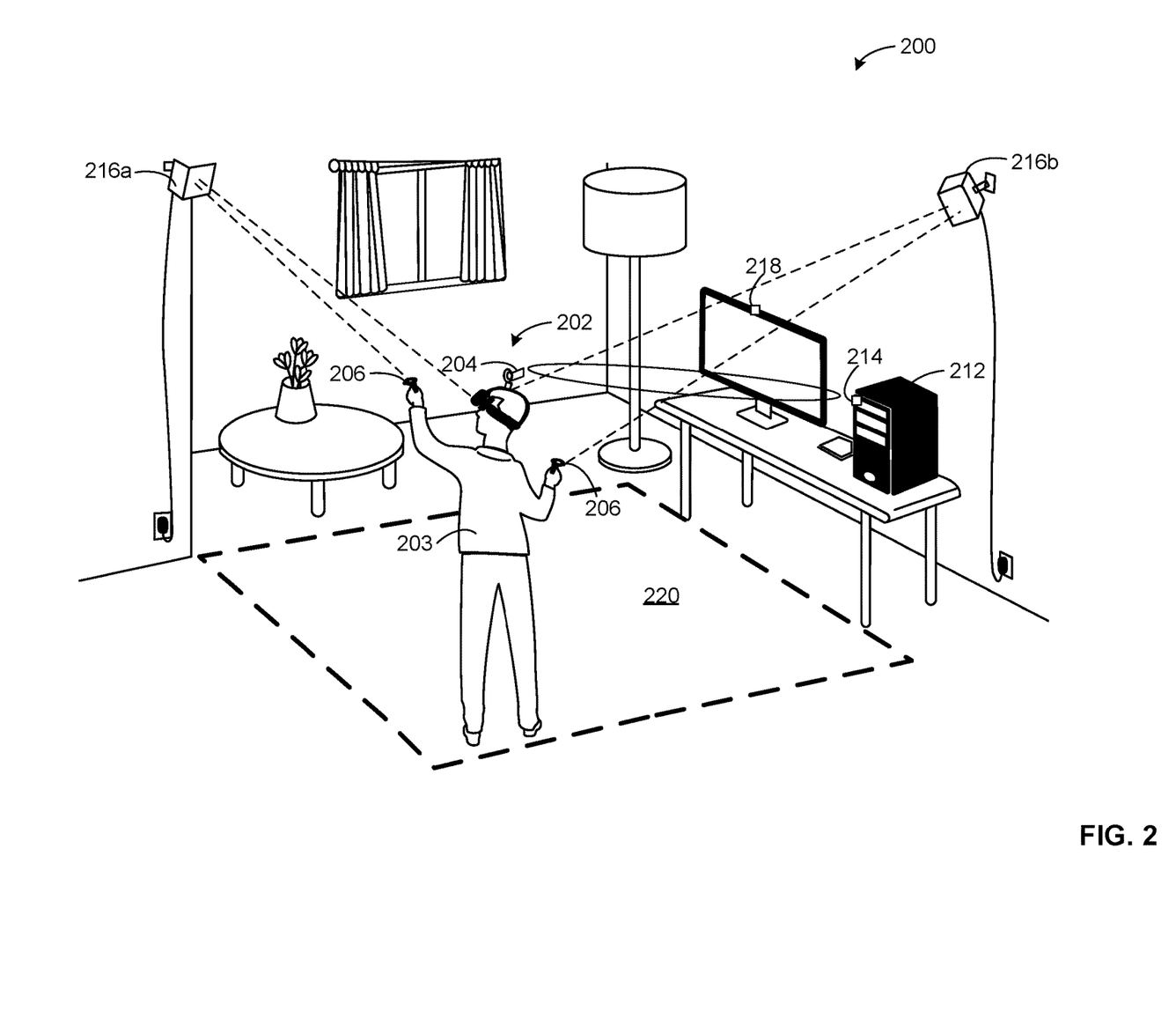
FIG. 2 is an example wireless virtual reality system in accordance with the teachings of this disclosure.

FIG. 2 is an example wireless virtual reality system 200 in accordance with the teachings of this disclosure. The wireless virtual reality system 200 of the illustrated example includes an example head-mounted device 202 worn by a person or user 203 and having an antenna (e.g., an antenna array, an RFEM, an RFEM array, etc.) 204. The example wireless virtual reality system 200 also includes controller(s) 206 (e.g., hand controllers) 206, a base station (e.g., a desktop computer, a video game console, a media device, etc.) 212 with a corresponding wireless transceiver (e.g., a WiGig™ protocol transceiver, etc.) or antenna 214, and emitters (e.g., wall mounted positional emitters, infrared emitters, etc.) 216a, 216b. In this example, a movement, a position, an orientation and/or a translation of the user 203 is tracked, calculated and/or determined when the user 203 moves within a zone 220 while the head-mounted device 202 and the transceiver 214 are communicating therebetween so that corresponding images, rendered images and/or video can be displayed to the head-mounted device 202.

To track the user 203 within the zone 220, the emitters 216a, 216b generate a beam and/or light pattern which, in turn, is detected by a sensor 316 (shown in FIG. 3) and/or the antenna 204 to track a movement, a position, an articulation and/or a posture of the user 203. In other examples, the base station 212, which is implemented as a personal computer in this example, is communicatively coupled to a positional sensor 218 that visually track a movement, a position, an articulation and/or a posture of the user 203 by utilizing image sensors (e.g., cameras, camera sensors, infrared sensors, etc.). In such examples, the positional sensor 218 is used to determine and/or calculate motion and/or positioning of the user 203 by tracking an outline/shape of the user 203 and/or tracking the controllers 206. In some examples, respective radiating beams of the emitters 216a, 216b are detected by the positional sensor 218.

To maintain at least a minimum threshold data communication rate between the head-mounted device 202 and the base station 212 while the user 203 moves (e.g., translates, rotates, articulates, etc.) within the zone 220, the antenna 204 of the head-mounted device 202 is able to be displaced rotationally so that the antenna 204 remains within and/or oriented towards a coverage zone (e.g., a high data rate transmission zone/range) corresponding to the transceiver 214. In other words, an orientation of the antenna 204 is continuously and/or periodically adjusted generally towards (e.g., within a certain degree towards) the transceiver 214 to maintain at least a minimum threshold data communication rate, which may be required to drive displays (e.g., pixels of the displays) of the head-mounted device 202. Additionally or alternatively, a translation (e.g., a linear displacement along one or more axes) of the antenna 204 of the head-mounted device 202 is adjusted to maintain the antenna 204 oriented towards the coverage zone. According to the illustrated example, the antenna 204 is placed on a relatively high position and/or height (e.g., a high point) of the head-mounted device 202, thereby avoiding potential obstructions caused by the user 203 (e.g., body part obstructions).

Figure 3:
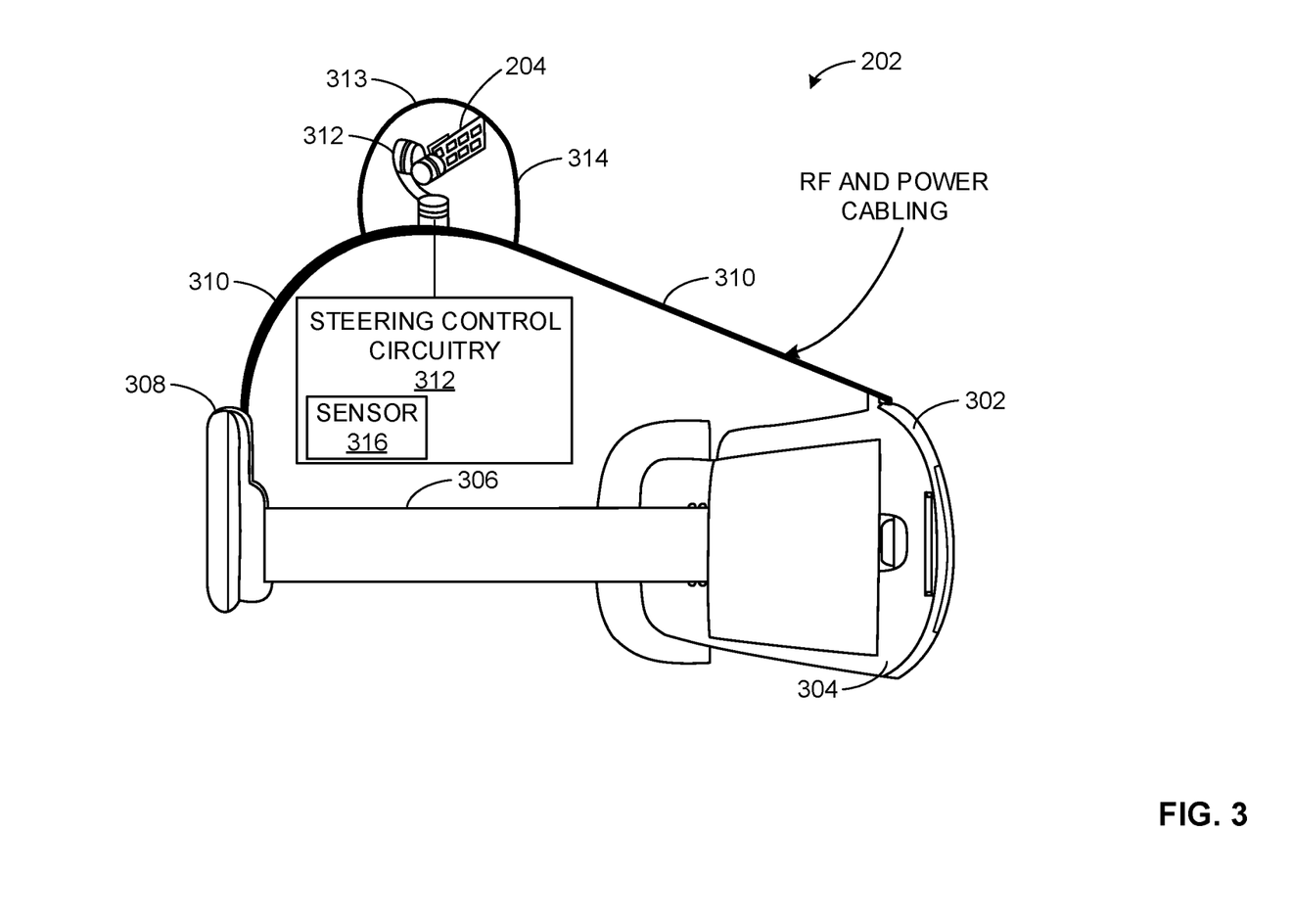
FIG. 3 illustrates an example head-mounted device of the example wireless virtual reality system of FIG. 2.

FIG. 3 illustrates the example head-mounted device 202 of the example virtual reality system 200 of FIG. 2. According to the illustrated example of FIG. 3, the example head-mounted device 202 includes a display portion 302 having goggles 304, a head band/strap 306, a battery 308, an upper support (e.g., an upper strap, an upper web, an overhead support, etc.) 310, a steering control circuitry 312, and the antenna 204, which is implemented as an RFEM in this example and mounted to a steering mount (e.g., a directional adjuster, e.g., a motorized steering mount, an actuated steering mount) 313. In some examples, the example head-mounted device 202 also includes a radome 314. In this example, the upper support 310 supports and or covers wiring that communicatively couples the goggles 304, the antenna 204 and/or the battery 308.

In some examples, the steering control circuitry 312 is disposed within the goggles 304 and used to direct/control movement of the steering mount 313. In such examples, detected movement of the head-mounted device 202 causes the steering mount 313 to orient the antenna 204 towards a coverage zone. In particular, the sensor 316 (e.g., an accelerometer, a gyroscope, an infrared sensor, a signal strength sensor, a beam strength sensor, etc.) disposed in the head-mounted device 202 and/or the steering control circuitry 312 detects an extent to which the head-mounted device has been rotated and/or translated away from the coverage zone and, accordingly, the control circuitry 312 moves (e.g., rotates) the antenna 204 via the steering mount 313 to accommodate this movement of the head-mounted device 202, thereby maintaining the antenna 204 oriented towards the coverage zone so that a minimum communication rate between the head-mounted device 202 and the base station 212 can be maintained. Alternatively, in other examples, the steering control circuitry 312 utilizes measured signal strength and/or signal strength mapping to direct movement of the steering mount 313.

Figure 4:
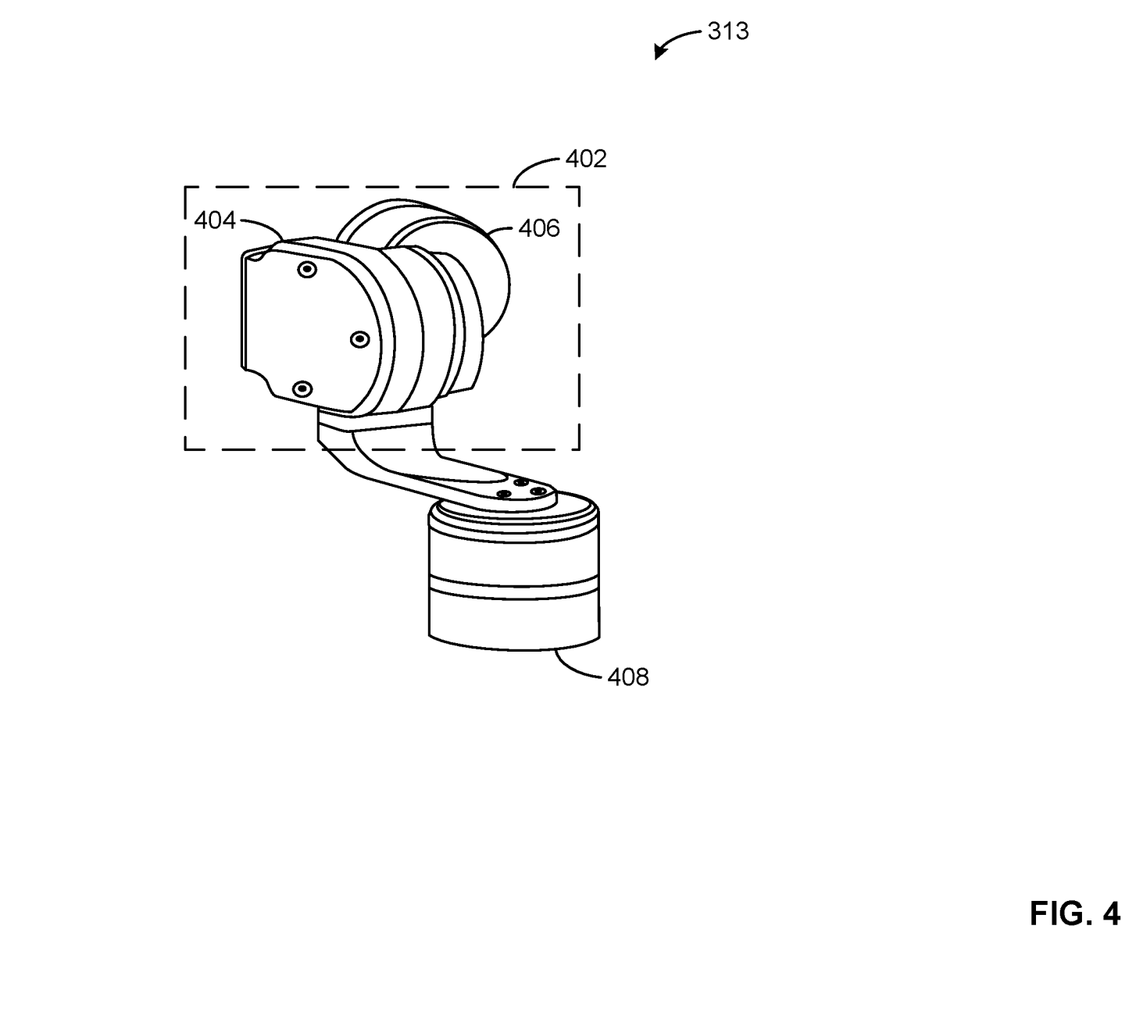
FIG. 4 illustrates an example steering mount of the example head-mounted device of FIG. 3.

FIG. 4 illustrates the example steering mount 313 that may be implemented in the example head-mounted device 202 of FIGS. 2 and 3. The steering mount 313 of the illustrated example is communicatively coupled to the steering control circuitry 312 and includes a mount (e.g., an antenna/RFEM mounting platform, a mounting flange, etc.) 402 that is rotatable in three different rotational axes (e.g., three rotational degrees of freedom) by a first axial direction rotator (e.g., motor assembly, rotatable motor mount, etc.) 404, a second axial direction rotator 406 and a third axial direction rotator 408, all of which are implemented in this example as motors that are processor-controlled. In this example, the first axial direction rotator 404, the second axial direction rotator 406 and the third axial direction rotator 408 can be rotated independent of one another. In some examples, at least two of the first axial direction rotator 404, the second axial direction rotator 406 and the third axial direction rotator 408 are simultaneously adjusted.

In this example, the first axial direction rotator 404, the second axial direction rotator 406 and the third axial direction rotator 408 provide rotational/orientation adjustments to the mount 402, thereby adjusting an orientation of the antenna 204 coupled thereto. However, the steering mount 313 may also include translational adjustments, which may include, but is not limited to, a linear actuator, a solenoid, a gearbox, a rack and pinion, etc. While a three-axis rotational steering device is shown in the example of FIG. 4, any appropriate rotational steering device or number of degrees of freedom (e.g., orientation and/or translational) may be used (e.g., single axis, two axis, five axis, ten axis, etc.).

Figure 5:
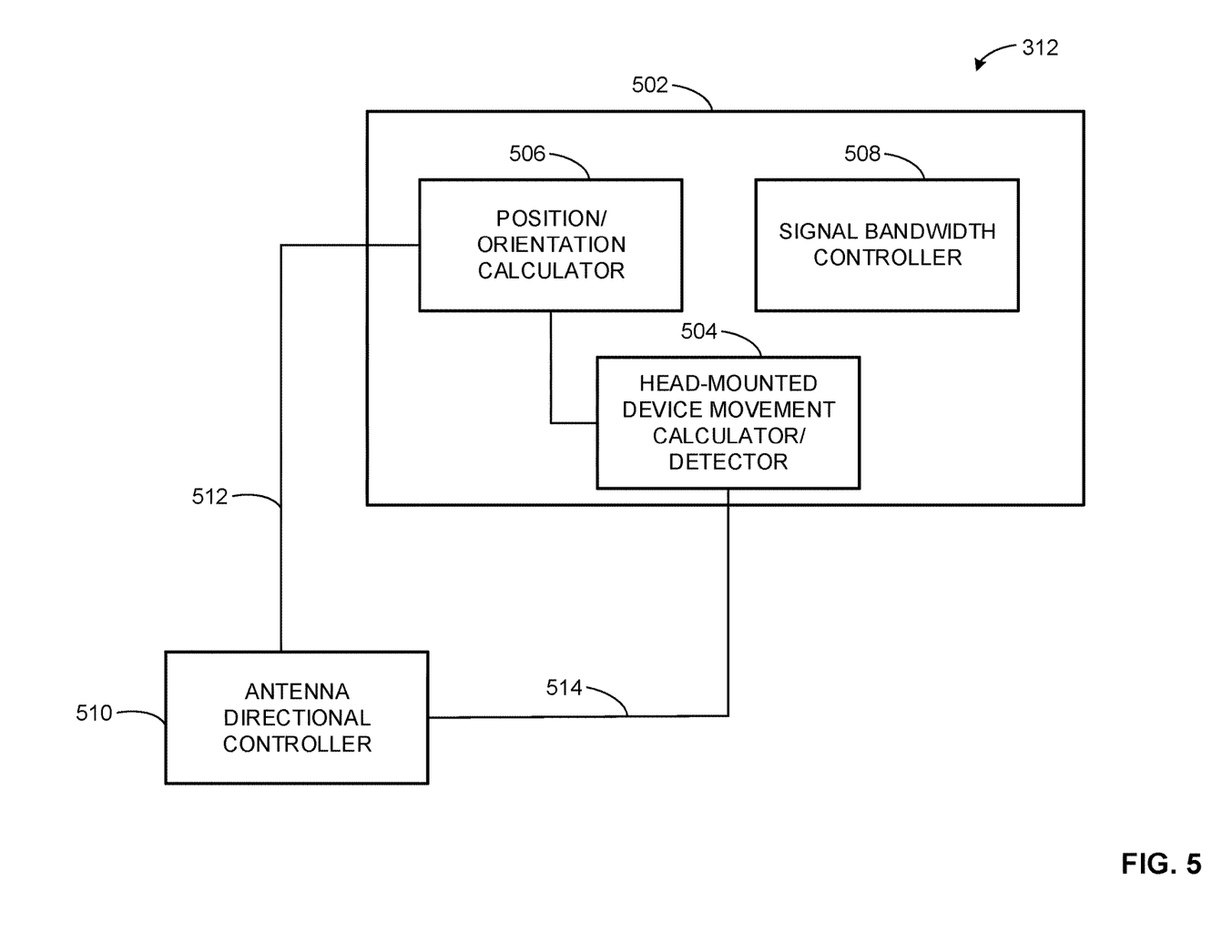
FIG. 5 is a schematic overview of example steering control circuitry that may be implemented with or in conjunction with the example head-mounted device of FIG. 3.

FIG. 5 is a schematic overview of the example steering circuitry 312 that may be implemented with or in conjunction with the example head-mounted device 202. The steering circuitry 312 of the illustrated example includes an antenna controller 502, which includes a position/orientation calculator 506, a signal bandwidth controller 508, and a head-mounted device movement calculator/detector 504. The example steering circuitry 312 also includes an antenna directional controller 510 that is communicatively coupled to the position/orientation calculator 506 via a communication line 512 as well as the head-mounted device movement calculator/detector 504 via a communication line 514.

In operation, to determine or calculate a change in orientation, relative position and translation of the head-mounted device 202 and/or the antenna 204 is detected by the head-mounted device movement calculator/detector 504 using the sensor 316, which may be implemented as a gyro or an accelerometer, for example. Additionally or alternatively, the head-mounted device movement calculator/detector 504 determines a movement of the head-mounted device 202 based on a change in a detected signal strength from the corresponding wireless base station 212 to which headset 202 is communicatively coupled. In such examples, the movement calculator/detector 504 may utilize signal strength difference(s) and/or signal strength mapping to calculate a degree to which the headset 202 has been oriented and/or moved away from a coverage zone corresponding to the base station. In some examples, the head-mounted device movement calculator/detector 504 is communicatively coupled to the sensor 316 of the head-mounted device 202 and/or the positional sensor 218 that is coupled to the base station 212 to detect movement of the head-mounted device 202.

To calculate a desired orientation (e.g., an adjustment orientation) to adjust an orientation of the antenna 204 to via the example steering mount 313, the position/orientation calculator 506 of the illustrated example utilizes the detected and/or calculated change in orientation and/or translation of the head-mounted device 202 and/or the antenna 204 to calculate the desired orientation to maintain the antenna 204 sufficiently (e.g., to a certain degree) oriented towards the coverage zone. As a result, a data communication rate at or beyond a minimum threshold data rate (e.g., a minimal threshold communication rate required to drive displays of goggles) is maintained. In some examples, the position/orientation calculator 506 performs relative position/Euclidean calculations.

Additionally or alternatively, in some examples, the position/orientation calculator 506 predicts and/or utilizes predictions of user body movement(s) (e.g., based on acceleration and/or velocity vectors of user's head and/or portions of their body). In some examples, position/orientation calculator 506 determines not only an orientation (e.g., a calculated orientation) that maintains the antenna 204 in the coverage zone, but also calculates an orientation and/or orientation range that maintains the antenna 204 at higher transmission orientations within the coverage zone, which are designated herein as preferred coverage zones.

According to the illustrated example, the signal bandwidth controller 508 monitors and/or detects whether sufficient bandwidth and/or signal strength is being measured at the antenna 204 to maintain a sufficient transmission data rate. In this example, the signal bandwidth controller 508 periodically and/or continuously determines that the antenna 204 is receiving signals with sufficient communication rates and if the communication rate is not above a minimum threshold data communication rate, which may exceed the minimum communication rate necessary to direct graphic rendering of the head-mounted device 202, the signal bandwidth controller 508 directs the position/orientation calculator 506 to calculate an updated or new desired orientation.

The antenna directional controller 510 of the illustrated example is directed/caused by the position/orientation calculator 506 to change an orientation and/or translation of the antenna 204 to maintain the antenna 204 to be directed towards the coverage zone. In this example, the antenna directional controller 510 conveys any positional, rotational and/or translational information of the steering mount 313 to the head-mounted device movement calculator/detector 504.

While an example manner of implementing the steering circuitry 312 is illustrated in FIG. 5, one or more of the elements, processes and/or devices illustrated in FIG. 5 may be combined, divided, re-arranged, omitted, eliminated and/or implemented in any other way. Further, the example position/orientation calculator 506, the example signal bandwidth controller 508, the example head-mounted device movement calculator/detector 504, the example antenna directional controller 510 and/or, more generally, the example steering circuitry 312 of FIGS. 3 and 5 may be implemented by hardware, software, firmware and/or any combination of hardware, software and/or firmware. Thus, for example, any of the example position/orientation calculator 506, the example signal bandwidth controller 508, the example head-mounted device movement calculator/detector 504, the example antenna directional controller 510 and/or, more generally, the example steering circuitry 312 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example position/orientation calculator 506, the example signal bandwidth controller 508, the example head-mounted device movement calculator/detector 504, and/or the example antenna directional controller 510 is/are hereby expressly defined to include a tangible computer readable storage device or storage disk such as a memory, a digital versatile disk (DVD), a compact disk (CD), a Blu-ray disk, etc. storing the software and/or firmware. Further still, the example steering circuitry 312 of FIGS. 3 and 5 may include one or more elements, processes and/or devices in addition to, or instead of, those illustrated in FIG. 5, and/or may include more than one of any or all of the illustrated elements, processes and devices.

Figure 6:
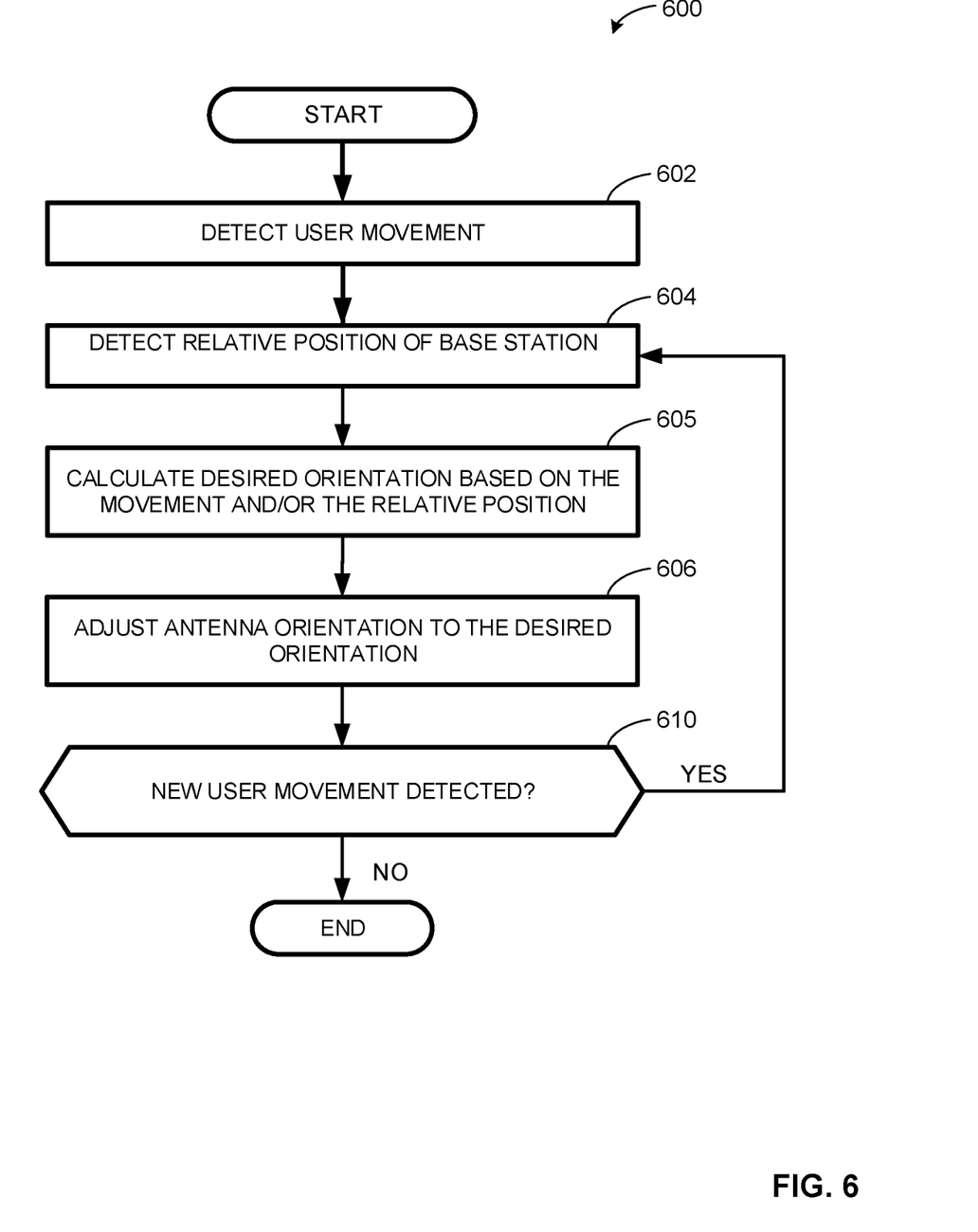
FIG. 6 is a flowchart representative of machine readable instructions that may be executed to implement the example steering control system of FIG. 5.
Figure 7:
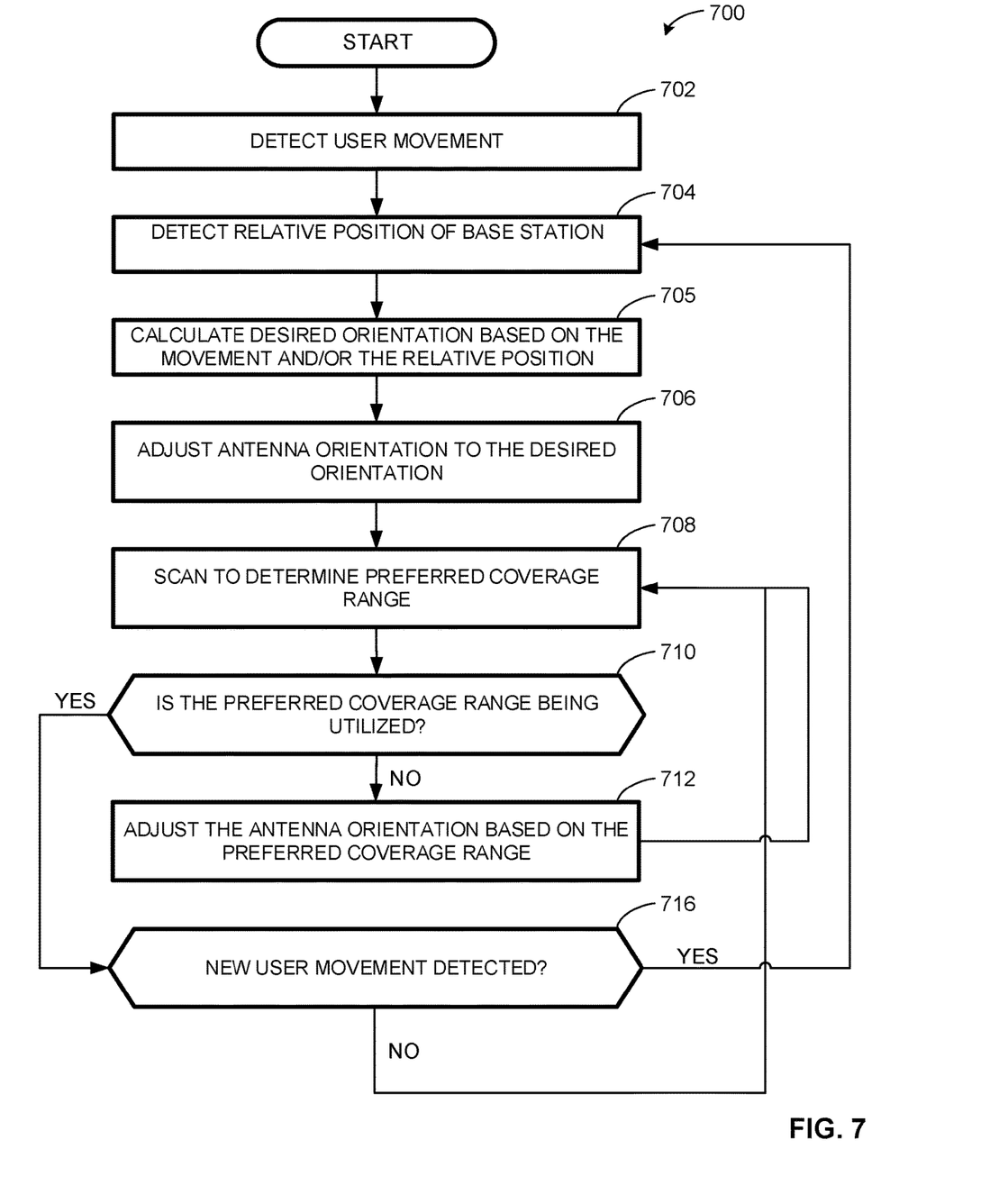
FIG. 7 is a flowchart representative of alternative machine readable instructions that may be executed to implement the example steering control circuitry of FIG. 5.
Figure 8:
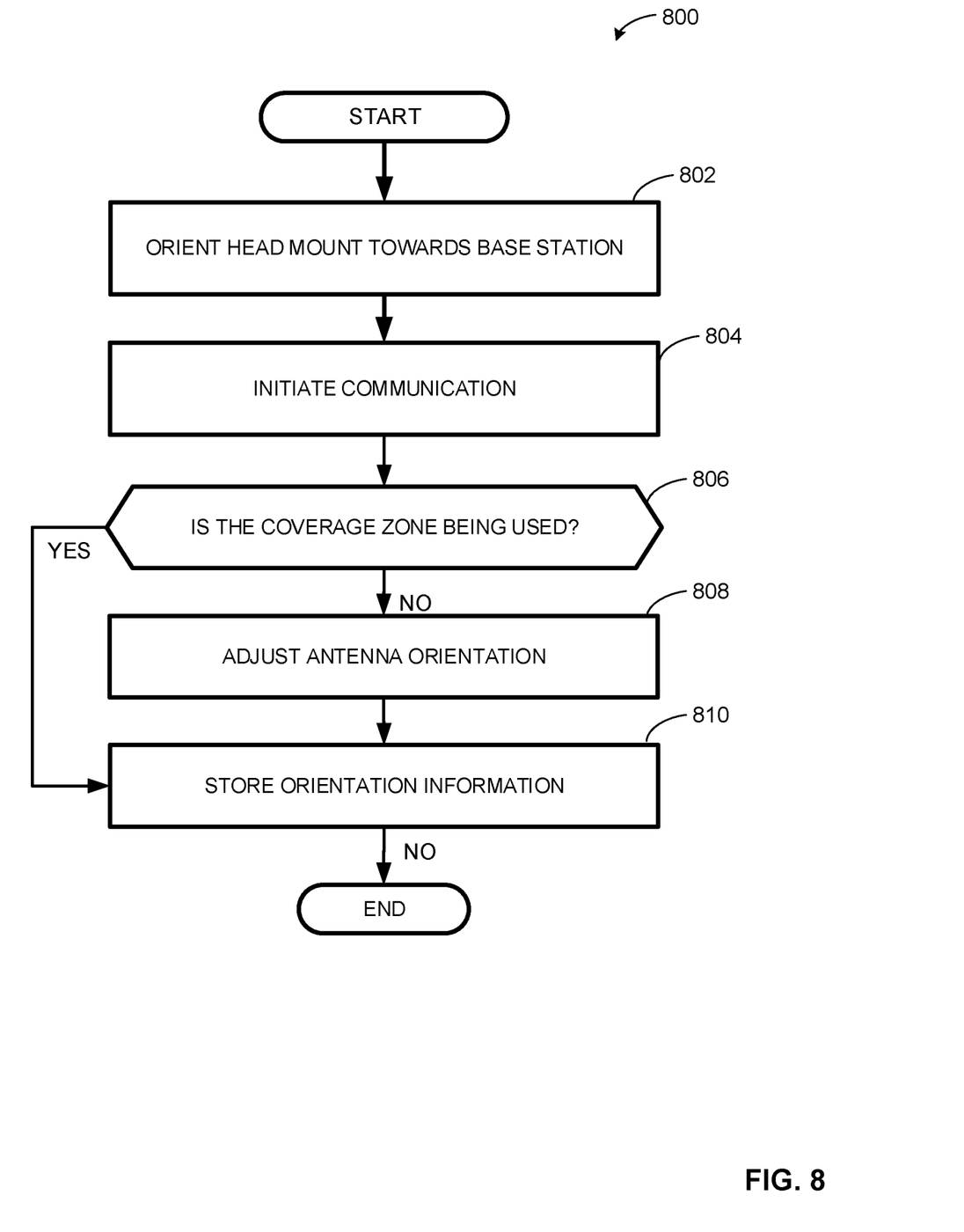
FIG. 8 is a flowchart representative of machine readable instructions that may be executed to calibrate the example steering control circuitry of FIG. 5.

Flowcharts representative of example machine readable instructions for implementing the steering circuitry 312 of FIGS. 3 and 5 are shown in FIGS. 6, 7 and 8. In this example, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 6, 7 and 8, many other methods of implementing the example steering circuitry 312 may alternatively be used. For example, the order of execution of the blocks may be changed, and/or some of the blocks described may be changed, eliminated, or combined.

As mentioned above, the example processes of FIGS. 6, 7 and 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6, 7 and 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example program 600 of FIG. 6 begins as the user 203 wearing the head-mounted device 202 is moving within the example zone 220. According to the illustrated example, the head-mounted device 202 is communicatively coupled to the wireless transceiver 214 of the base station 212 so that the base station 212 can render graphics to be transmitted to goggles of the head-mounted device 202. In this example, the transmission of the rendered graphics requires a minimal threshold transmission data rate between the antenna 204 and the transceiver 214, and data rates exceeding this threshold are maintained by maintaining the head-mounted device in a heading lock mode.

According to the illustrated example, the head-mounted device movement calculator/detector 504 determines/detects movement of the user 203 (block 602). For example, accelerometers of the head-mounted device 202 may be used to determine/detect this movement. In some examples, a signal strength between the head-mounted device 202 and the base-station 212 is used to detect and/or infer this movement. Additionally or alternatively, in some examples, emitted beams and/or signals emitted from the emitters 216a, 216b are detected/used by the head-mounted device movement calculator/detector 504 to determine/detect the movement of the user 203 and/or the head-mounted device 202.

In this example, a relative position of the base station 212 is determined (block 604). In particular, the position/orientation calculator 506 of the illustrated example determines the relative position of the transceiver 214 of the base station 212 relative to the head-mounted device 202 and/or the antenna 204.

Next, a desired orientation of the antenna 204 is calculated by the example position/orientation calculator 506 based on the movement and/or the relative position (block 605). For example, the position/orientation calculator 506 may use spatial and/or Euclidean calculations to determine this desired orientation. Additionally or alternatively, predicted motion, velocity and/or acceleration of the user 203 is taken into account.

According to the illustrated example, the position/orientation calculator 506 directs the antenna directional controller 510 to adjust the orientation of the antenna 204 to the desired orientation (block 606). In particular, the antenna 204 is oriented towards the coverage zone of the wireless transceiver 214 via the antenna directional controller 510 to increase and/or maintain a desired communication rate.

Next, it is determined whether a new user movement has been detected (block 610). In particular, a change in signal strength measured at the antenna 204 and/or the transceiver 214 may be used to make this determination. Additionally or alternatively, an accelerometer of the head-mounted device 202 may be used. In some examples, the emitters 216a, 216b are detected by the sensor 316 for this determination. If a user movement has not been detected (block 610), the process ends. Otherwise, the control of the process returns to block 604. Alternatively, in some examples, either a decrease in signal communication rate (e.g., a reduction in the communication rate over time) and/or a reduction in signal communication rate below a defined threshold (e.g., below that of the coverage zone) causes a return of control of the process to block 604.

The example program 700 of FIG. 7 is similar to the program 600 of FIG. 6, but includes further adjustment (e.g., fine-tuning) of the orientation of the antenna 204 to increase transmission bandwidth. In this example, while the antenna 204 is generally maintained at an orientation towards the transceiver 214, the steering mount 313 of the illustrated example further and/or continuously adjusts orientation of the antenna 204 even while the antenna 204 is oriented within the coverage zone of the base station 212. In other words, the antenna 204 is further oriented into a preferred coverage zone of the coverage zone (e.g., within the coverage zone).

A user movement is detected by the head-mounted device movement calculator/detector 504 (block 702). In some examples, the base station 212 detects and/or determines this movement (e.g., via the sensor 316, the sensor 218 and/or the emitters 216a, 216b).

According to the illustrated example, a relative position of the base station 212 is determined and/or calculated by the position/orientation calculator 506 (block 704).

A desired orientation is calculated by the position/orientation calculator 506 based on the movement and/or the relative position (block 705).

In this example, the position/orientation calculator 506 causes the steering mount 213 to adjust the orientation of the antenna 204 to the desired orientation (block 706).

In this example, a scan is performed to determine a preferred coverage range (e.g., a desired sector, highest gain broad-side sectors, etc.) corresponding to the base station 212 (block 708). In particular, the signal bandwidth controller 508 determines whether the antenna 204 is oriented towards and/or within a desired or preferred coverage range/sector corresponding to the transceiver 214. In this example, the desired or preferred coverage range corresponds to significantly increased data communication rates (e.g., maximum data communication rates) between the antenna 204 and the transceiver 214.

Next, it is determined whether the preferred coverage range is being used (block 710). In particular, preferred coverage range angles and/or highest gain broad-side sector(s) associated with the transceiver 214 are determined to be in use. If the preferred coverage range and/or highest gain broad-side sector(s) are not being used (block 710), control of the process proceeds to block 712. Otherwise, control of the process proceeds to block 716.

According to the illustrated example, an orientation of the antenna 204 is adjusted if the preferred coverage range is not being used (block 712) and control of the process returns to block 708. For example, the orientation of the antenna 204 may be adjusted towards the preferred coverage zone.

Once the preferred coverage range is being used, it is then determined whether a new user movement has been detected (block 716) and if the new user movement has been detected (block 716), control of the process returns to block 704. Otherwise, control of the process returns to block 708.

The example program 800 of FIG. 8 begins as the antenna 204 of the head-mounted device 202 is to be calibrated for wireless communication with the example transceiver 214. In particular, a relative position and/or orientation of the head-mounted device 202 and/or the antenna 204 with respect to the transceiver 214 is being characterized in an initial position for later determinations of the relative orientation and position of the antenna 204 with respect to the transceiver 214.

According to the illustrated example, the antenna 204 is oriented towards the transceiver 214 of the base station 212 (block 802). In particular, the user 203 may generally orient the head-mounted device 202 towards the transceiver 214 while the antenna 204 is oriented in a known neutral or zeroed baseline orientation, for example.

According to the illustrated example, communication is initiated between the antenna 204 and the transceiver 214 (block 804). In this particular, a communication link and/or scan interval is created/defined between the head-mounted device 202 and the base station 212. In some examples, a test signal may be communicated therebetween.

Next, it is determined by the head-mounted device movement calculator detector 504 as to whether the coverage zone (e.g., broad-side sector(s) of the transceiver 214) is being used (block 806). If the coverage zone is not being used (block 806), control of the process proceeds to block 808. Otherwise, control of the process proceeds to block 810. Alternatively, it is determined whether the preferred coverage zone associated with higher data communication rates within the coverage zone is being used.

An orientation of the antenna 204 is adjusted if the coverage zone is not being used (block 808). For example, the position/orientation calculator 506 directs the antenna directional controller 510 to re-orient the antenna 204 via the steering mount 213.

Orientation data of the antenna 204 is stored if the coverage zone associated with the transceiver 214 are being used (block 810) and the process ends. In other examples, the antenna 204 may, alternatively, be calibrated to the preferred coverage zone of the transceiver 214 as opposed to only the overall coverage zone.

Figure 9:
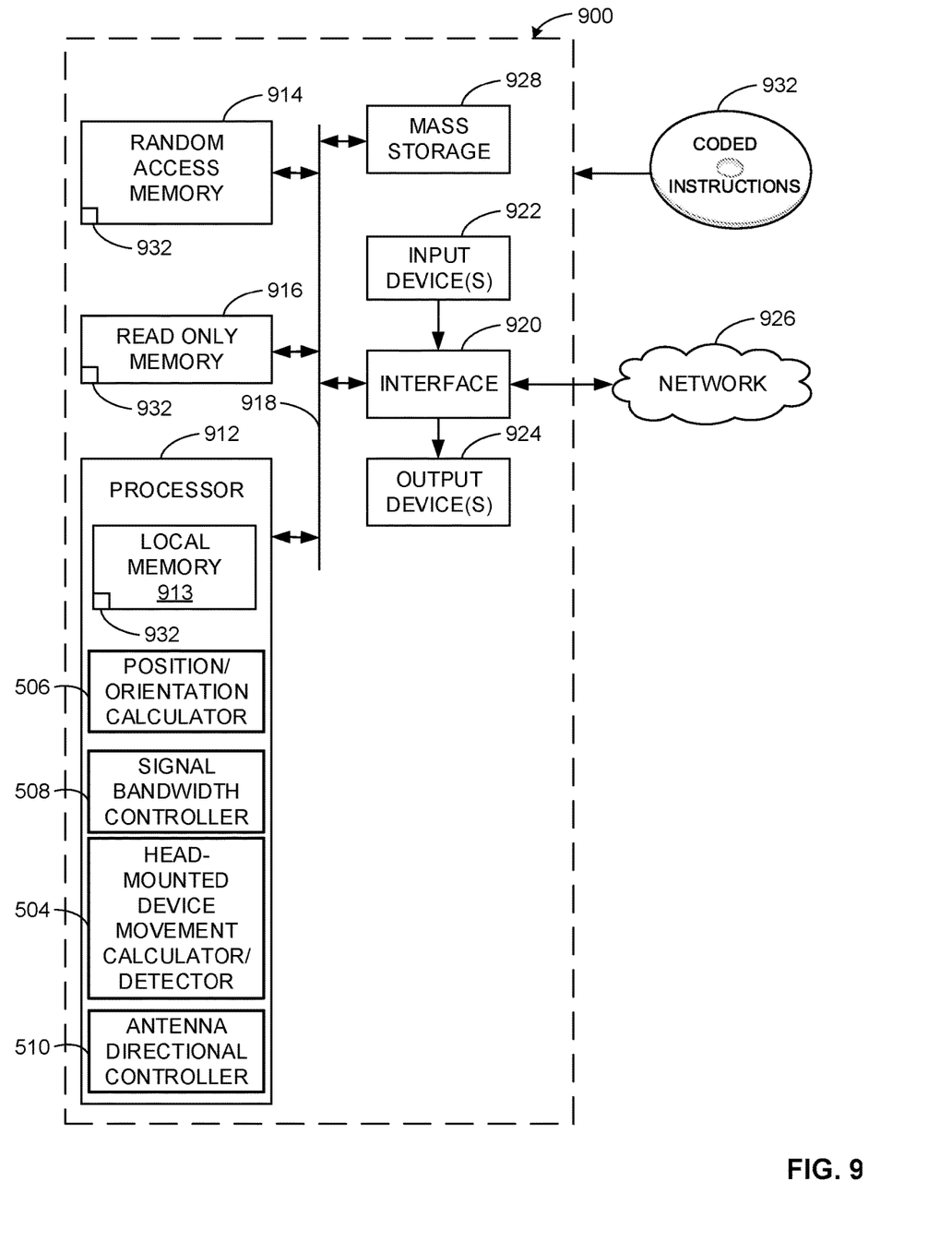
FIG. 9 is a processor platform that may be used to execute the example instructions of FIGS. 6, 7 and/or 8 to implement the example steering circuitry of FIG. 5.

FIG. 9 is a block diagram of an example processor platform 900 capable of executing the instructions of FIGS. 6, 7 and 8 to implement the example steering circuitry 312 of FIGS. 3 and 5. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). In this example, the processor 912 also includes the example position/orientation calculator 506, the example signal bandwidth controller 508, the example head-mounted device movement calculator/detector 504 and the example antenna directional controller 510. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 6, 7 and 8 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture enable high bandwidth wireless signals between an antenna of a headset/head-mounted device to a coverage zone (e.g., a high data rate transmission zone) of a base station even when the head-mounted device is translated, moved and/or rotated, thereby preventing potential loss of signal and/or data transfers at a reduced rate. The examples disclosed herein also enable a high bandwidth transmission range in which a wireless headset may be moved and/or rotated a full 360 degrees without significant decrease in data communication rates. The examples disclosed herein also enable significantly faster scanning speeds of virtual reality headsets, for example.

Example 1 includes a wearable device including an antenna to be communicatively coupled to a wireless data transceiver of a base station, and a steering mount coupled to the antenna, the steering mount to adjust an orientation of the antenna towards a wireless coverage zone associated with the wireless data transceiver based on a movement of the wearable device.

Example 2 includes the subject matter of Example 1, and further includes a screen display disposed in a goggle portion of the wearable device.

Example 3 includes the subject matter of Example 2, where the wearable device includes a virtual reality headset.

Example 4 includes the subject matter of any one of Examples 1 to 3, and further includes a radome, where the antenna and the steering mount are disposed within the radome.

Example 5 includes the subject matter of Example 4, where the radome is fixed to an upper overhead support of the wearable device.

Example 6 includes the subject matter of any one of Examples 1 to 5, where the steering mount includes a gimbal.

Example 7 includes the subject matter of Example 6, where the gimbal includes three rotational degrees of freedom.

Example 8 includes the subject matter of any one of Examples 1 to 7, and further includes a sensor to detect a relative position of the antenna relative to the wireless coverage zone.

Example 9 includes the subject matter of any one of Examples 1 to 8, and further includes steering control circuitry to direct adjustment of the orientation of the antenna based on at least one of measured signal strength or signal strength mapping.

Example 10 includes determining, using a processor, a relative position of a coverage zone of a wireless base station with respect to a wearable device, and orienting an antenna of the wearable device towards the coverage zone based on the determined relative position to maintain a communication rate between the wireless base station and the wearable device at or beyond a minimum threshold communication rate.

Example 11 includes the subject matter of Example 10, and further includes detecting, via a sensor, a relative orientation of the coverage zone, where determining the relative orientation is based on the relative position.

Example 12 includes the subject matter of any one of Examples 10 or 11, and further includes determining a preferred coverage zone within the coverage zone, and re-orienting the antenna to the preferred coverage zone to increase the communication rate.

Example 13 includes the subject matter of any one of Examples 10 to 12, where orienting the antenna includes controlling a gimbal that is coupled to the antenna.

Example 14 includes the subject matter of any one of Examples 10 to 13, and further includes translating the antenna to maintain the communication rate at or beyond the minimum threshold communication rate.

Example 15 includes the subject matter of any one of Examples 10 to 14, where orienting the antenna is to occur when a communication rate is below the minimum threshold communication rate has been measured.

Example 16 includes the subject matter of any one of Examples 10 to 15, where determining the relative position is based on a movement or translation of the wearable device.

Example 17 includes the subject matter of any one of Examples 10 to 16, where orienting the antenna is based on at least one of a measured signal strength or signal strength mapping.

Example 18 includes a tangible machine readable medium comprising instructions, which when executed, cause a processor to at least determine a relative orientation of an antenna of a wearable device with respect to a wireless base station to which the wearable device is communicatively coupled, calculate an adjustment orientation of the antenna to maintain the antenna oriented towards a coverage zone corresponding to the wireless base station based on the determined relative orientation, and cause the antenna to be oriented based on the adjustment orientation.

Example 19 includes the subject matter of Example 18, where the relative orientation is determined based on a movement or translation of the wearable device.

Example 20 includes the subject matter of Examples 18 or 19, where the instructions cause the processor to calculate a relative position of the antenna with respect to the wearable device, and where the adjustment orientation is further based on the relative position.

Example 21 includes the subject matter of any one of Examples 18-20, where the instructions cause the processor to determine whether a communication rate between the wearable device and the wireless base station is below a minimum threshold communication rate, where the antenna is caused to be oriented further based on the communication rate being below the threshold.

Example 22 includes the subject matter of any one of Examples 18-21, where the instructions cause the processor to determine a preferred coverage zone within the coverage zone, calculate a preferred orientation based on the preferred coverage zone, and cause the antenna to be re-oriented towards the preferred coverage zone based on the preferred orientation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are related to virtual reality headsets, the examples disclosed herein may be implemented in any appropriate application including augmented reality glasses and/or goggles, wearables, smart watches, wearable indicators and/or motion capture equipment, etc.

What is claimed is:

1. A headset to be mounted to a user, the headset comprising:
    an antenna to receive an output of a sensor, the output associated with a movement of the user detected by the sensor, the sensor remote from the user and mounted to a structure of a building;
    a steering mount to adjust an orientation of the antenna towards a wireless coverage zone associated with a wireless data transceiver of a base station based on the output of the sensor, the steering mount operatively coupled to a motor; and
    a radome to cover the antenna, the motor and the steering mount; the radome to be positioned on top of a head of the user when the headset is mounted to the user.

2. The headset as defined in claim 1, further including a screen display in a goggle portion of the headset.

3. The headset as defined in claim 1, wherein the radome is fixed to an overhead portion of the headset.

4. The headset as defined in claim 3, further including a gimbal operatively coupled to the steering mount.

5. The headset as defined in claim 1, wherein the sensor is a first sensor, the output is a first output, and the antenna is to receive a second output of a second sensor, the second sensor to detect a position of the antenna relative to the wireless coverage zone.

6. The headset as defined in claim 1, wherein the steering mount is to adjust the orientation of the antenna based on at least one of measured signal strength or a signal strength map.

7. The headset as defined in claim 1, wherein the output of the sensor includes data associated with at least one of a posture or an articulation of the user.

8. A method comprising:
    obtaining, via an antenna of a wearable device worn by a user, an output from a sensor located remotely from the user and mounted to a structure of a building, the output associated with a movement of the user wearing the wearable device; and
    orienting, by executing an instruction with a processor, the antenna of the wearable device towards a coverage zone associated with a wireless base station based on the output of the sensor to maintain a communication rate between the wireless base station and the wearable device at or beyond a threshold communication rate, wherein the orienting of the antenna is controlled by a steering mount operatively coupled to a motor, and a radome covers the antenna, the motor and the steering mount the radome to be positioned on top of a head of the user when the wearable device is mounted to the user.

9. The method as defined in claim 8, further including determining a relative orientation of the antenna relative to the coverage zone, the orienting of the antenna is further based on the relative orientation.

10. The method as defined in claim 8, further including:
determining a preferred coverage zone within the coverage zone; and
re-orienting the antenna with respect to the preferred coverage zone to increase the communication rate.

11. The method as defined in claim 8, wherein the orienting of the antenna includes controlling a gimbal to move the antenna.

12. The method as defined in claim 8, further including moving the antenna to maintain the communication rate at or beyond the threshold communication rate.

13. The method as defined in claim 8, wherein the orienting of the antenna is requested when the communication rate falls below the threshold communication rate.

14. The method as defined in claim 8, wherein the orienting of the antenna is further based on a posture of the user.

15. The method as defined in claim 8, wherein the orienting of the antenna is further based on at least one of a measured signal strength or signal strength map.

16. A non-transitory machine readable medium comprising instructions, which when executed, cause at least one processor of a wearable device to at least:

track a movement of a user wearing the wearable device based on an output from a sensor remote from the user and mounted to a structure of a building, the output received via an antenna of the wearable device;

calculate an adjustment of the antenna to maintain the antenna in an orientation directed towards a coverage zone corresponding to a wireless base station based on the output; and cause a steering mount operatively coupled to a motor to cause movement of the antenna based on the adjustment, wherein a radome covers the antenna, the motor and the steering mount; the radome to be positioned on top of a head of the user when the wearable device is mounted to the user.

17. The non-transitory machine readable medium as defined in claim 16, wherein the instructions cause the at least one processor to calculate the adjustment based on a posture of the user.

18. The non-transitory machine readable medium as defined in claim 16, wherein the instructions cause the at least one processor to:
determine whether a communication rate between the wearable device and the wireless base station is below a threshold; and
cause the movement of the antenna in response to the communication rate falling below the threshold.

19. The non-transitory machine readable medium as defined in claim 16, wherein the instructions cause the at least one processor to:
determine a preferred coverage zone within the coverage zone;
calculate a preferred orientation based on the preferred coverage zone; and
cause the antenna to be re-oriented towards the preferred coverage zone based on the preferred orientation.

* * * * *